(12) United States Patent
Shirai et al.

(10) Patent No.: US 10,597,926 B2
(45) Date of Patent: Mar. 24, 2020

(54) CLUTCH, MOTOR, AND POWER WINDOW DEVICE

(71) Applicant: DENSO CORPORATION, Kariya-shi, Aichi-ken (JP)

(72) Inventors: Nakatsune Shirai, Kariya (JP); Hiroyuki Okada, Kariya (JP); Kenta Suzuki, Kariya (JP)

(73) Assignee: DENSO CORPORATION, Kariya-shi, Aichi-ken (JP)

( * ) Notice: Subject to any disclaimer, the term of this patent is extended or adjusted under 35 U.S.C. 154(b) by 0 days.

(21) Appl. No.: 16/083,377

(22) PCT Filed: Mar. 13, 2017

(86) PCT No.: PCT/JP2017/009936
§ 371 (c)(1),
(2) Date: Sep. 7, 2018

(87) PCT Pub. No.: WO2017/159600
PCT Pub. Date: Sep. 21, 2017

(65) Prior Publication Data
US 2019/0093415 A1  Mar. 28, 2019

(30) Foreign Application Priority Data
Mar. 17, 2016 (JP) ................................ 2016-054197

(51) Int. Cl.
*E05F 15/08* (2006.01)
*E05F 15/697* (2015.01)
(Continued)

(52) U.S. Cl.
CPC .............. *E05F 15/697* (2015.01); *B60J 1/17* (2013.01); *F16D 41/067* (2013.01); *F16D 41/10* (2013.01);
(Continued)

(58) Field of Classification Search
CPC ......... E05F 15/697; B60J 1/17; F16D 41/067; E05Y 2900/55; F16H 1/16; F16H 21/44; H02K 7/10
(Continued)

(56) References Cited

U.S. PATENT DOCUMENTS 4,949,824 A  *  8/1990  Buckley ................... F16D 7/021
                                                  188/196 D
10,156,262 B2 * 12/2018 Yamashita ................ F16D 3/00
(Continued)

FOREIGN PATENT DOCUMENTS

EP        3147526 A1  *  3/2017  ........... F16D 41/066
JP      2002122162 A      4/2002
(Continued)

OTHER PUBLICATIONS

International Search Report for PCT/JP2017/009936 dated May 30, 2017, 2 pages.
(Continued)

*Primary Examiner* — Jerry E Redman
(74) *Attorney, Agent, or Firm* — Kilpatrick Townsend & Stockton LLP

(57) ABSTRACT

A clutch is configured, when a driving-side rotor is in a non-driven-rotated state, to prevent rotation of a driven-side rotor by setting a rolling element in a lock state in which the rolling element is held by a control surface and a collar. The clutch is configured so that when the driving-side rotor is driven and rotated in the lock state, the driving-side rotor pushes the rolling element via two circumferential holders in a rotation direction to release the rolling element from the lock state. Each of the two circumferential holders includes a guide portion configured to guide the rolling element toward a radially inner side of the collar when the rolling element is released from the lock state.

7 Claims, 9 Drawing Sheets

(51) Int. Cl.
*B60J 1/17* (2006.01)
*F16D 41/067* (2006.01)
*H02K 7/10* (2006.01)
*F16D 41/10* (2006.01)
*F16H 1/16* (2006.01)
*F16H 21/44* (2006.01)

(52) U.S. Cl.
CPC ............ *H02K 7/10* (2013.01); *E05Y 2900/55* (2013.01); *F16H 1/16* (2013.01); *F16H 21/44* (2013.01)

(58) Field of Classification Search
USPC .......................................................... 49/349
See application file for complete search history.

(56) References Cited

U.S. PATENT DOCUMENTS

| | | | | |
|---|---|---|---|---|
| 2002/0158527 | A1* | 10/2002 | Kawakami | H02K 5/148 310/78 |
| 2004/0099498 | A1 | 5/2004 | Kurita et al. | |
| 2012/0061200 | A1* | 3/2012 | Yamashita | F16D 43/02 192/45.001 |
| 2012/0192491 | A1* | 8/2012 | Katayama | E05F 11/445 49/324 |
| 2015/0068858 | A1* | 3/2015 | Seith | F16D 41/066 192/45.004 |
| 2015/0176662 | A1* | 6/2015 | Lee | F16D 25/061 192/45.1 |
| 2017/0059002 | A1* | 3/2017 | Sasaki | B60J 5/10 |
| 2017/0175827 | A1* | 6/2017 | Inukai | F16D 41/067 |
| 2017/0268584 | A1* | 9/2017 | Heath | B60K 17/26 |
| 2018/0105113 | A1* | 4/2018 | Motomiya | B60R 1/074 |
| 2018/0195565 | A1* | 7/2018 | Ogino | F16D 65/186 |
| 2018/0283467 | A1* | 10/2018 | Aramoto | F16D 15/00 |
| 2019/0162248 | A1* | 5/2019 | Oguri | F16D 41/105 |
| 2019/0211891 | A1* | 7/2019 | Reimchen | F16D 41/06 |

FOREIGN PATENT DOCUMENTS

| | | | |
|---|---|---|---|
| JP | 2009287680 A | 12/2009 | |
| JP | 2012082952 A | 4/2012 | |
| WO | WO-2010150771 A1 * | 12/2010 | ........... F16D 41/063 |
| WO | 2017/159600 A1 | 9/2017 | |
| WO | WO-2017159600 A1 * | 9/2017 | ................ B60J 1/17 |

OTHER PUBLICATIONS

International Preliminary Report on Patentability for PCT/JP2017/009936 dated Sep. 18, 2018, all pages.

* cited by examiner

CLUTCH, MOTOR, AND POWER WINDOW DEVICE

TECHNICAL FIELD

The present invention relates to a clutch coupled to, for example, a motor serving as a drive source of a vehicle power window device.

BACKGROUND ART

For example, patent document 1 discloses a prior art motor used as a drive source of a power window device installed on a vehicle or the like. The motor includes a rotation shaft that is driven and rotated, a worm shaft of a speed reduction mechanism that reduces the speed of rotational driving force transmitted from the rotation shaft, and a clutch. The rotation shaft and the worm shaft are connected by the clutch. The clutch includes an annular collar and a driving-side rotor, a driven-side rotor, a rolling element, and a retainer (referred to as support member in patent document 1), which are located at an inner side of the collar. The driving-side rotor rotates integrally with the rotation shaft. The driven-side rotor rotates integrally with the worm shaft. The rolling element has, for example, a circular cross section. The retainer holds the rolling element. The driven-side rotor includes a control surface opposed to the inner circumferential surface of the collar. The rolling element is located between the control surface and the inner circumferential surface of the collar. The retainer includes two circumferential holders configured to rotate in a circumferential direction and holding the rolling element at opposite sides in the circumferential direction.

In a motor including a clutch such as that described above, when the rotation shaft is driven and rotated to rotate the driving-side rotor, a rolling element releaser of the driving-side rotor pushes the rolling element via the retainer (circumferential holders) in a rotation direction. As a result, with the rolling element separated from the control surface and the collar, the rolling element, the retainer, the driven-side rotor, and the worm shaft integrally rotate, and the vehicle window glass opens and closes based on the rotation of the worm shaft. When the rotation shaft (driving-side rotor) is in a non-driven-rotated state, the rolling element is held and wedged by the control surface of the driven-side rotor and the inner circumferential surface of the collar so that rotation of the driven-side rotor is prevented (locked). This limits a situation in which the vehicle window glass is opened and closed, for example, by an external force other than the motor driving force.

PRIOR ART DOCUMENT

Patent Document

Patent Document 1: Japanese Laid-Open Patent Publication No. 2012-82952

SUMMARY OF THE INVENTION

Problems that are to be Solved by the Invention

In a clutch such as that described above, when the driving-side rotor is driven and rotated with the driven-side rotor in the lock state, the rolling element releaser of the driving-side rotor forces out the rolling element, which is held by the control surface and the inner circumferential surface of the collar, via the retainer (circumferential holders) in the rotation direction. As a result, the rolling element is released from the state held by the control surface and the collar and is set to a released state in which the driven-side rotor and the rolling element are integrally rotational. However, when the rolling element is forced out (released) from the state held by the control surface and the collar as described above, noise may be generated by the rolling element sliding along the inner circumferential surface of the collar.

It is an object of the present invention to provide a clutch, a motor, and a power window device that limit generation of noise when a lock is released.

Means for Solving the Problem

To achieve the above object, a clutch according to the present disclosure includes an annular collar, a driving-side rotor, a driven-side rotor, a rolling element, and a retainer. The collar has an inner circumferential surface. The driving-side rotor is configured to be driven and rotated. The driven-side rotor has a control surface opposed to the inner circumferential surface of the collar. The rolling element is located between the control surface and the collar and has two opposite sides in a circumferential direction of the collar. The retainer includes two circumferential holders holding the two opposite sides of the rolling element, which is located between the control surface and the collar. The retainer is configured to rotate in the circumferential direction. The clutch is configured, when the driving-side rotor is in a non-driven-rotated state, to prevent rotation of the driven-side rotor by setting the rolling element in a lock state in which the rolling element is held by the control surface and the collar. The clutch is configured so that when the driving-side rotor is driven and rotated in the lock state, the driving-side rotor pushes the rolling element via the two circumferential holders in a rotation direction to release the rolling element from the lock state. Each of the two circumferential holders includes a guide portion configured to guide the rolling element toward a radially inner side of the collar when the rolling element is released from the lock state.

With this configuration, when the rolling element is pushed by the driving-side rotor via the circumferential holder in the rotation direction and released from the lock state (state held by control surface and inner circumferential surface of collar), the guide portion of the circumferential holder guides the rolling element toward a radially inner side of the collar. Thus, when the lock is released, the rolling element is smoothly separated from the inner circumferential surface of the collar. This limits generation of noise caused by sliding of the rolling element along the inner circumferential surface of the collar.

Preferably, the guide portion has a tapered surface inclined toward the rolling element in the circumferential direction as the tapered surface extends radially outward. The tapered surface is contactable with the rolling element in the circumferential direction.

With this configuration, when the driving-side rotor pushes the rolling element via the circumferential holder in the rotation direction, the tapered surface of the guide portion (circumferential holder) contacts the rolling element in the rotation direction. Urging force is applied radially inward from the tapered surface to the rolling element. Thus, the guide portion guides the rolling element radially inward.

Preferably, the rolling element is rod-shaped and extends in an axial direction of the collar when located between the two circumferential holders. The rolling element is configured, when the rolling element is in the lock state, to be in contact with the inner circumferential surface of the collar in the axial direction. The guide portion is configured, when the rolling element is released from the lock state, to guide the rolling element so that the rolling element is inclined with respect to the axial direction.

With this configuration, as the rolling element is inclined with respect to the axial direction by the guide of the second guide portion, the rolling element is released from the lock state (state in which rolling element is in contact with inner circumferential surface of collar in axial direction). Thus, when the lock is released, the rolling element is separated from the inner circumferential surface of the collar in a stepped manner from one axial end side to the other axial end side. This further limits generation of noise caused by sliding of the rolling element along the inner circumferential surface of the collar.

Preferably, the guide portion is inclined toward the rolling element in the circumferential direction as the guide portion extends toward one side in the axial direction. The guide portion includes an inclined surface contactable with the rolling element in the circumferential direction.

With this configuration, when the lock is released, the inclined surface of the guide portion contacts the rolling element in the rotation direction. Accordingly, the rolling element is inclined along the inclined surface. Thus, when the lock is released, the rolling element is inclined with respect to the axial direction.

Preferably, the rolling element is at least one of a first rolling element and a second rolling element. The two circumferential holders are at least one of a set of two first circumferential holders corresponding to the first rolling element and a set of two second circumferential holders corresponding to the second rolling element. The clutch is configured so that when the driving-side rotor is driven and rotated with the first rolling element and the second rolling element in the lock state, the first circumferential holders come into contact with the first rolling element in the rotation direction and the first rolling element is released from the lock state, while the second rolling element remains in the lock state without the second circumferential holders contacting the second rolling element in the rotation direction.

With this configuration, the two rolling elements are released from the lock state at different timings. Thus, in a configuration having multiple rolling elements, noise generated by releases from the lock state is reduced as compared to when the rolling elements are simultaneously released from the lock state.

A motor according to the present disclosure includes the clutch described above, a motor body, and a speed reduction portion. The motor body includes a rotation shaft configured to rotate integrally with the driving-side rotor of the clutch. The speed reduction portion includes a driven shaft configured to rotate integrally with the driven-side rotor of the clutch. The speed reduction portion is configured to reduce speed of rotational driving force transmitted from the rotation shaft through the driving-side rotor and the driven-side rotor to the driven shaft and output the rotational driving force.

With this configuration, a motor that limits generation of noise from the clutch is provided.

A power window device according to the present disclosure includes the motor described above as a drive source and a window glass configured to selectively open and close based on driving of the motor.

EMBODIMENTS OF THE INVENTION

One embodiment of a clutch, a motor, and a power window device will now be described.

Figure 1:
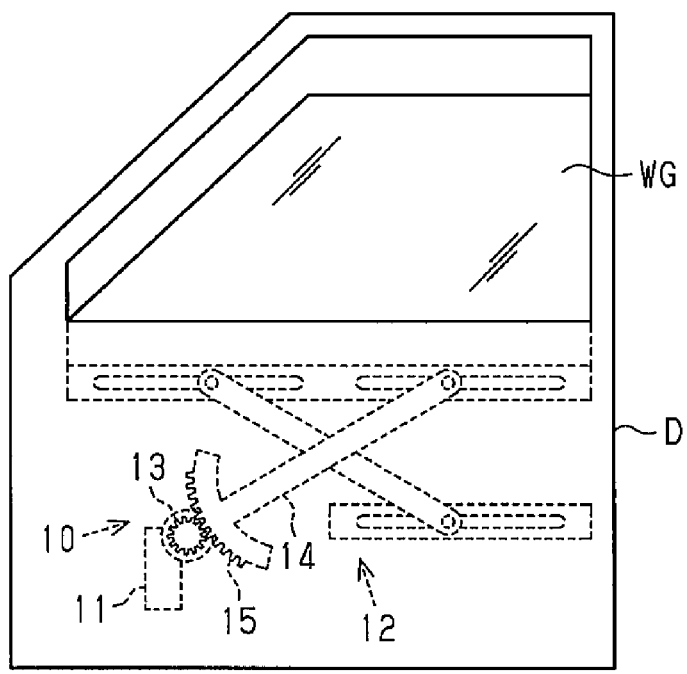
FIG. 1 is a schematic configuration diagram showing one embodiment of a power window device according to the present invention.

As shown in FIG. 1, a power window device 10 of the present embodiment is installed to a vehicle door D to open and close a window glass WG of the vehicle door D. The power window device 10 includes a motor 11 and an X-arm type window regulator 12 that opens and closes the window glass WG based on rotation of the motor 11. The motor 11 includes an output shaft 13. The window regulator 12 includes arms 14, one of which includes a sector gear 15 engaging the output shaft 13.

Motor Configuration

Figure 2:
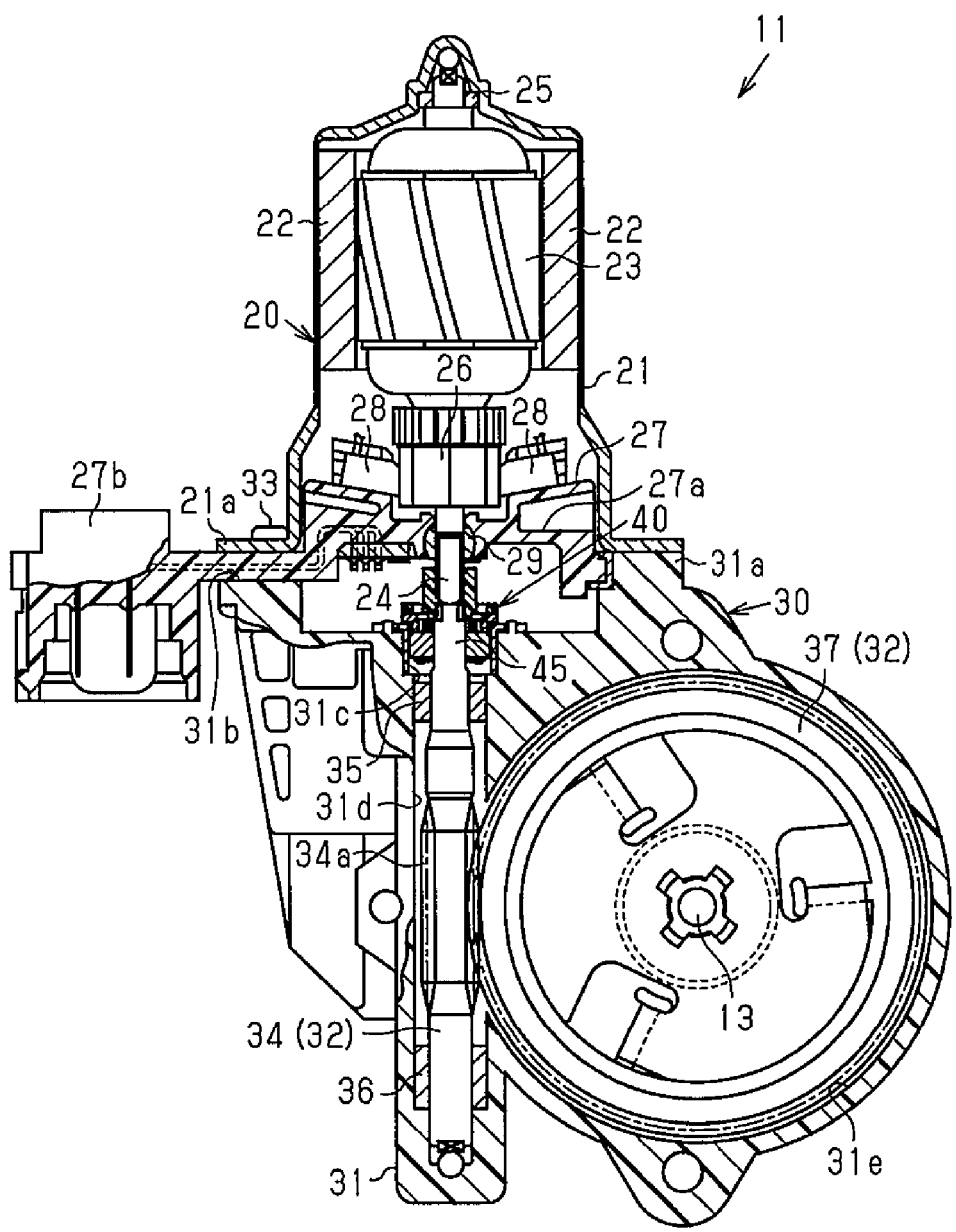
FIG. 2 is a cross-sectional view of the motor shown in FIG. 1.

As shown in FIG. 2, the motor 11 includes a geared motor in which a motor body 20 and a speed reduction portion 30 are coupled integrally. The motor 11 includes a clutch 40 on a drive coupling portion between the motor body 20 and the speed reduction portion 30.

The motor body 20 includes a direct current motor. The motor body 20 includes a tubular yoke 21 (yoke housing), two magnets 22 opposed to each other and fixed to the inner circumferential surface of the yoke 21, and an armature 23 located at an inner side of the magnets 22. The armature 23 includes a rotation shaft 24 (driving shaft) located in a central portion of the yoke 21. The basal end (upper end in FIG. 2) of the rotation shaft 24 is axially supported by a bearing 25 located on a central portion of the wall end of the yoke 21. A tubular commutator 26 is fixed to the distal end of the rotation shaft 24. Additionally, the rotation shaft 24 includes a coupling portion 24a on a portion close to the distal end. The coupling portion 24a has the form of a cylinder that is parallel two-sided and has a width across flats. The distal end of the coupling portion 24a has a curved surface (part of spherical surface) (refer to FIG. 3).

The yoke 21 has an opening from which a flange 21a outwardly extends. A brush holder 27 is fitted to the opening of the yoke 21. The brush holder 27 includes a holder body 27a and a connector 27b that are formed integrally. The holder body 27a is shaped to close the opening of the yoke 21. The connector 27b projects outward in the radial direction of the yoke 21. The holder body 27a holds two brushes 28 connected to the connector 27b by wires, which are not shown in the drawings. The brushes 28 contact and slide along the commutator 26. A bearing 29 is arranged on a central portion of the holder body 27a. The bearing 29 axially supports a portion of the rotation shaft 24 between the commutator 26 and the coupling portion 24a. When an external power supplied through the connector 27b to the brushes 28 is supplied through the commutator 26 to the armature 23, the armature 23 (rotation shaft 24) is driven and rotated, that is, the motor body 20 is driven and rotated.

The speed reduction portion 30 of the motor 11 is formed by accommodating, for example, a speed reduction mechanism 32 in a resin gear housing 31. The gear housing 31 includes a fastening portion 31a on a portion (upper end in FIG. 2) opposed to the motor body 20 in the axial direction. The fastening portion 31a fastens the gear housing 31 to the motor body 20. The fastening portion 31a and the flange 21a of the yoke 21 have similar contours. The fastening portion 31a includes a fitting recess 31b that is open toward an inner side of the yoke 21. With the holder body 27a of the brush holder 27 fitted into the fitting recess 31b, the fastening portion 31a is fastened by a screw 33 to the flange 21a, which is in contact with the fastening portion 31a. This fastens the yoke 21 to the gear housing 31 and integrates the motor body 20 and the speed reduction portion 30.

The gear housing 31 includes a clutch accommodation recess 31c, which is recessed in the axial direction from the bottom center of the fitting recess 31b, and a worm shaft receptacle 31d, which is recessed from a central portion of the bottom of the clutch accommodation recess 31c and extends in the axial direction of the rotation shaft 24. The gear housing 31 includes a wheel receptacle 31e recessed at a side (right side in FIG. 2) of the worm shaft receptacle 31d. The wheel receptacle 31e is connected to the worm shaft receptacle 31d at an axially (longitudinally) center portion of the worm shaft receptacle 31d.

The worm shaft receptacle 31d accommodates a generally cylindrical worm shaft 34 serving as a driven shaft. The worm shaft 34 is formed from a metal material and includes a threaded tooth-shaped worm portion 34a at an axially center portion. The two axial ends of the worm shaft 34 are axially supported by two tubular metal bearings 35 and 35 located at two opposite ends of the worm shaft receptacle 31d in the axial direction. When the worm shaft 34 is axially supported by the bearings 35 and 36 in the worm shaft receptacle 31d, the worm shaft 34 is coaxial with the rotation shaft 24, that is, an axis L1 of the rotation shaft 24 is aligned with an axis L2 of the worm shaft 34 (refer to FIG. 3).

The wheel receptacle 31e rotationally accommodates a discoid worm wheel 37 engaging the worm portion 34a of the worm shaft 34. The worm wheel 37 together with the worm shaft 34 forms the speed reduction mechanism 32. The output shaft 13 extends in a radially central portion of the worm wheel 37 in the axial direction (direction orthogonal to plane of FIG. 2) and rotates integrally with the worm wheel 37. The output shaft 13 is coupled to the window regulator 12 to drive the window regulator 12 as described above (refer to FIG. 1).

Clutch Configuration

The clutch accommodation recess 31c of the gear housing 31 accommodates the clutch 40 coupling the rotation shaft 24 of the motor body 20 to the worm shaft 34 of the speed reduction mechanism 32.

Figure 3:
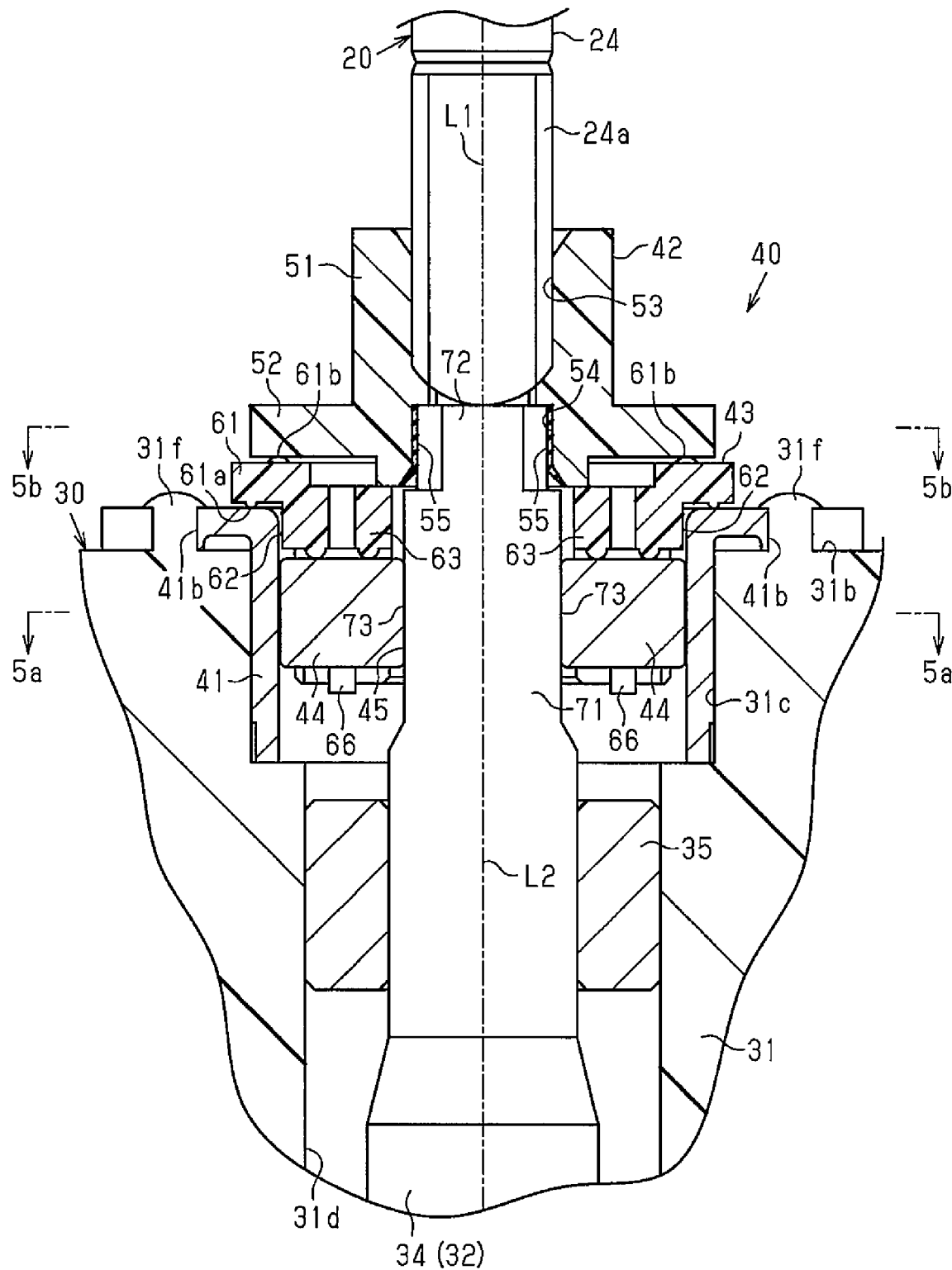
FIG. 3 is an enlarged cross-sectional view showing the configuration of the clutch shown in FIG. 2.
Figure 4:
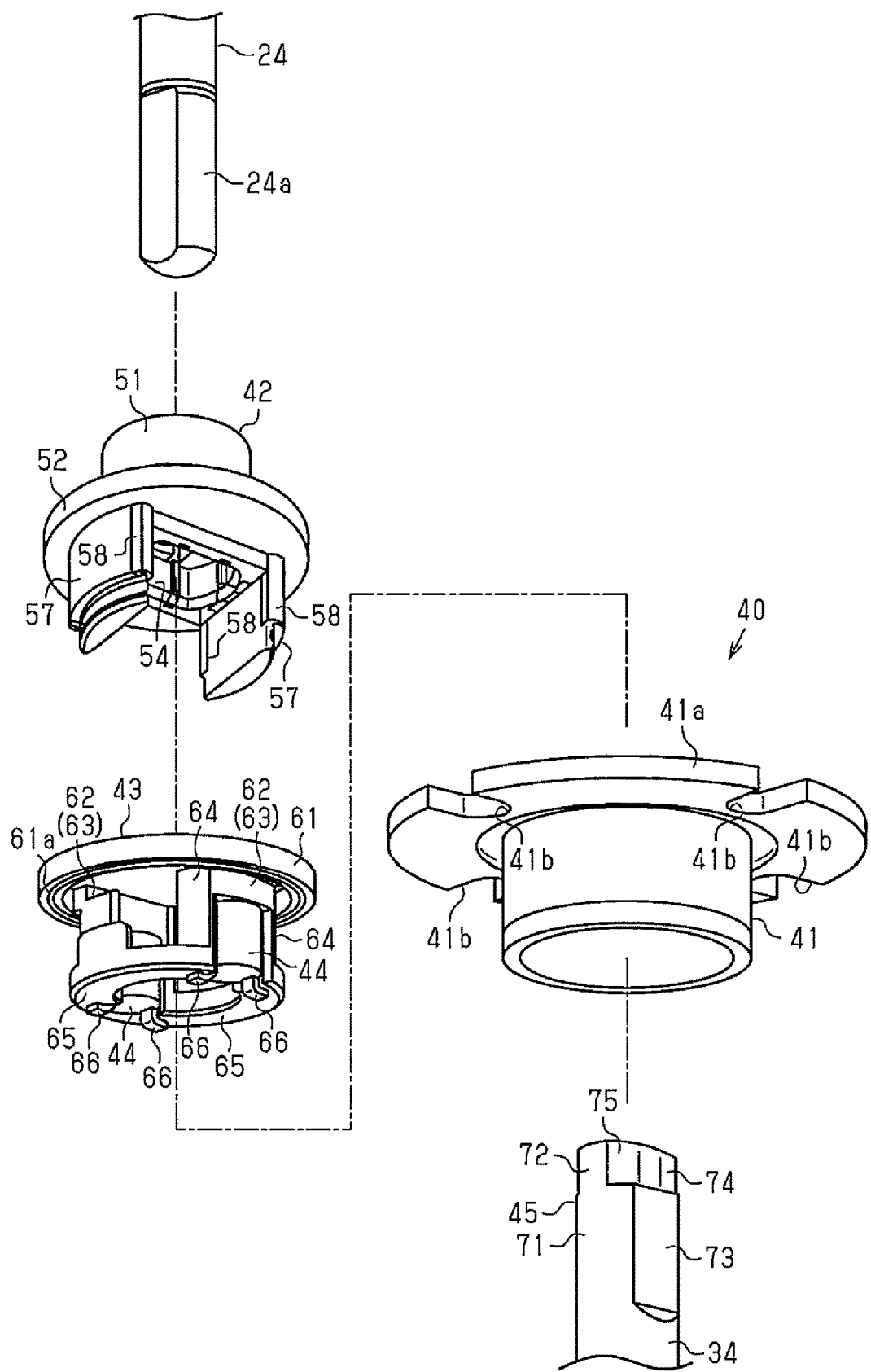
FIG. 4 is an exploded perspective view of the clutch shown in FIG. 3.

As shown in FIGS. 3 and 4, the clutch 40 includes a collar 41, a driving-side rotor 42, a retainer 43, rolling elements 44, and a driven-side rotor 45.

The collar 41 is tubular. A fixing flange 41a extends radially outward from one axial end of the collar 41. The outer diameter of the tubular portion of the collar 41 is substantially the same as the inner diameter of the clutch accommodation recess 31c. The outer diameter of the fixing flange 41a is larger than the inner diameter of the clutch accommodation recess 31c. The fixing flange 41a includes fixing recesses 41b in four locations at equal angular intervals in the circumferential direction. The fixing recesses 41b extend through the fixing flange 41a in the axial direction and are open radially outward.

As shown in FIG. 3, the collar 41 is inserted into the clutch accommodation recess 31c until the fixing flange 41a comes into contact with the bottom surface of the fitting recess 31b and is fixed to the gear housing 31 by the fixing flange 41a. More specifically, fixing projections 31f project from the bottom surface of the fitting recess 31b, or a circumferential edge defining the opening of the clutch accommodation recess 31c, in the axial direction at four locations at equal angular intervals in the circumferential direction. The four fixing projections 31f are respectively inserted into the four fixing recesses 41b of the fixing flange 41a in the axial direction, and the distal end of each fixing projection 31f is processed by heat swaging. As a result, the collar 41 is fixed to the gear housing 31 in a manner immovable in the axial direction and non-rotatable in the circumferential direction. The collar 41 fixed to the gear housing 31 is coaxial with the rotation shaft 24 and the worm shaft 34.

The driving-side rotor 42 includes a generally tubular shaft connector 51. The shaft connector 51 is formed integrally with a discoid flange 52 extending radially outward from the outer circumferential surface of the shaft connector 51.

The shaft connector 51 includes a driving shaft socket 53 extending in the axial direction from the axial center of the axial end (upper end in FIG. 3) opposed to the motor body 20. The driving shaft socket 53 has a width across flats (has at least two parallel surfaces) in conformance with the outer shape of the coupling portion 24a of the rotation shaft 24. When the coupling portion 24a is press-fitted into the driving shaft socket 53, the driving-side rotor 42 and the rotation shaft 24 are coupled to integrally rotate. When coupled to the rotation shaft 24, the driving-side rotor 42 is coaxial with the rotation shaft 24 (i.e., axes are aligned with each other).

As shown in FIGS. 3 and 4, the shaft connector 51 includes a driven shaft socket 54 extending in the axial direction from the axial center of the axial end (lower end in FIG. 3) located close to the speed reduction portion 30. The axis of the driven shaft socket 54 is aligned with the axis of the driving shaft socket 53. In the present embodiment, the driving shaft socket 53 and the driven shaft socket 54 are in communication with each other.

Figure 5A:
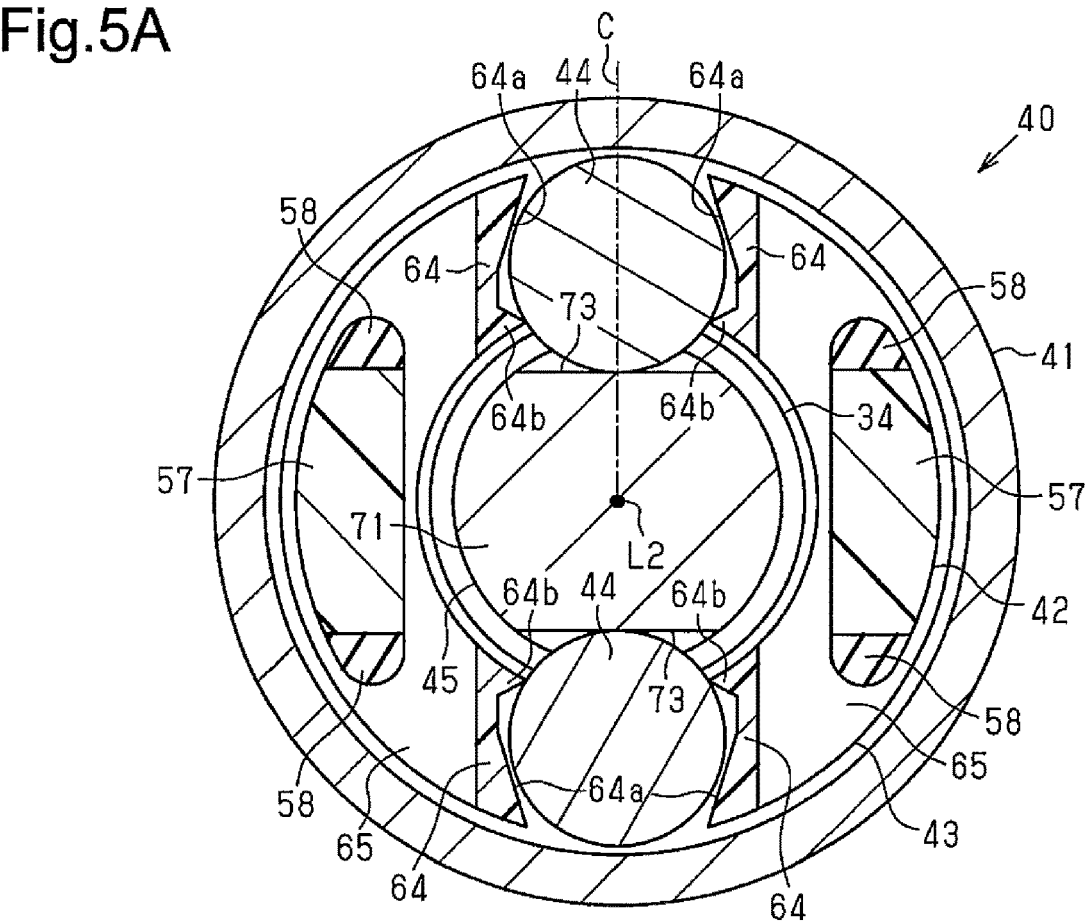
FIG. 5A is a cross-sectional view taken along line 5a-5a in FIG. 3.
Figure 5B:
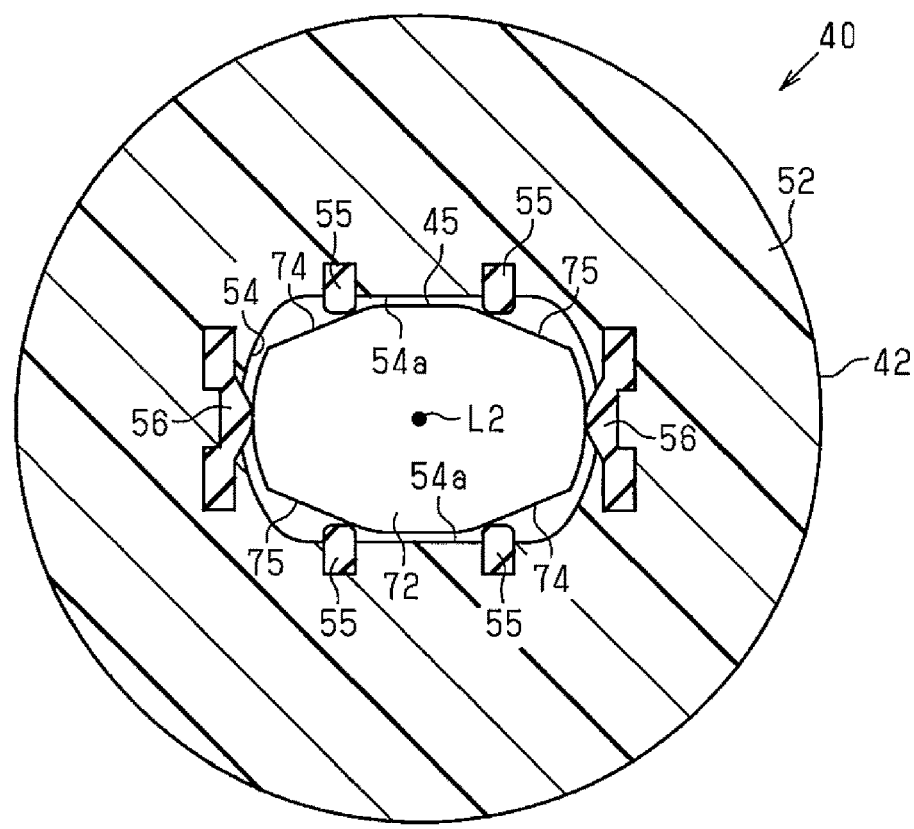
FIG. 5B is a cross-sectional view taken along line 5b-5b in FIG. 3.

As shown in FIG. 5B, the inner surface of the driven shaft socket 54 has two parallel driving-side transmission surfaces 54a that are flat and parallel to the axial direction. The driven shaft socket 54 is generally running track-shaped (has a width across flats) as viewed in the axial direction so that the direction parallel to the driving-side transmission surfaces 54a defines the longitudinal direction and the direction orthogonal to the driving-side transmission surfaces 54a defines the transverse direction. Each of the driving-side transmission surfaces 54a is provided with two first elastic members 55 formed from an elastic material such as a rubber material. Additionally, the inner surface of the driven shaft socket 54 is provided with second elastic members 56 on longitudinally opposite ends as viewed in the axial direction. The first and second elastic members 55 and 56 slightly project inward from the inner surface of the driven shaft socket 54.

As shown in FIG. 4, the driving-side rotor 42 includes two rolling element releasers 57 extending toward the speed reduction portion 30 in the axial direction of the flange 52. The rolling element releasers 57 are arranged at longitudinally opposite sides of the driven shaft socket 54 as viewed in the axial direction. The rolling element releasers 57 are located at 180° opposing positions in the circumferential direction and symmetrical with respect to a point in the axis L1 of the rotation shaft 24. The circumferentially opposite ends of each of the rolling element releasers 57 include elastic portions 58 formed from an elastic material such as a rubber material (refer to FIG. 5A). The rolling element releasers 57 are located at an inner side of the collar 41.

As shown in FIGS. 3 and 4, the clutch 40 includes the retainer 43 holding the rolling elements 44 at a circumferentially inner side of the collar 41. The retainer 43 is formed from a resin material.

The retainer 43 includes a ring 61 that is annular about the axis L2 of the worm shaft 34. The outer diameter of the ring 61 is larger than the inner diameter of the collar 41. The ring 61 is located closer to the motor body 20 (upper side in FIG. 3) than the fixing flange 41*a* of the collar 41 and is opposed to the fixing flange 41*a* in the axial direction. A lower projection 61*a* projects from the lower surface (axial end surface opposed to fixing flange 41*a*) of the ring 61 and contacts the fixing flange 41*a* in the axial direction. The lower projection 61*a* is annular in the circumferential direction of the ring 61. Additionally, an upper projection 61*b* projects from the upper surface (end surface close to driving-side rotor 42) of the ring 61 and contacts the flange 52 of the driving-side rotor 42 in the axial direction.

Rolling element holders 62 are located on a circumferentially inner side of the ring 61 at two positions separated in the circumferential direction (in the present embodiment, two positions at 180° intervals) to hold the generally cylindrical rolling elements 44. The rolling element holders 62 are symmetrical with respect to a point in the axis of the retainer 43 (conforming to axis L2 of worm shaft 34). The rolling elements 44, which are held by the rolling element holders 62, are arranged so that the axes of the rolling elements 44 are parallel to the axis L2 of the worm shaft 34. The rolling elements 44 are identical in shape.

Each of the rolling element holders 62 includes an axial support 63 extending radially inward from the ring 61. The axial support 63 supports an axially upper side (portion close to driving-side rotor 42) of the rolling element 44.

As shown in FIGS. 4 and 5A, each of the rolling element holders 62 includes two roller supports 64 serving as circumferential holders. The two roller supports 64 downwardly extend in the axial direction (direction of axis L2) from circumferentially opposite edges of the axial support 63. The two roller supports 64 are located at opposite sides of the rolling element 44 in the circumferential direction of the axis L2 to hold the rolling element 44 from the circumferentially opposite sides. In other words, the two roller supports 64 hold the rolling element 44 in a direction extending along the diameter of the rolling element 44.

As shown in FIG. 5A, in each of the rolling element holders 62, the two roller supports 64 are symmetrical with respect to a circumferential center line C that is orthogonal to the axis of the retainer 43 (conforming to axis L2 of worm shaft 34) and extends through the circumferential center of the rolling element holder 62. More specifically, the circumferential center line C of the rolling element holder 62 is a circumferential center line between the two roller supports 64.

Each of the roller supports 64 includes a tapered surface 64*a* on a side surface opposed to the rolling element 44 in the circumferential direction. The tapered surface 64*a* serves as a guide portion contactable with the rolling element 44 in the circumferential direction (rotation direction). The tapered surface 64*a* is flat and inclined toward the rolling element 44 in the circumferential direction as the tapered surface 64*a* extends radially outward. Also, the tapered surface 64*a* is parallel to the axial direction (direction of axis L2). In other words, the tapered surface 64*a* is formed so that the perpendicular line that is orthogonal to the tapered surface 64*a* is inclined radially inward with respect to the circumferential direction (rotation direction). The tapered surface 64*a* extends from a radially central portion to a radially outer end of the roller support 64.

Additionally, each of the roller supports 64 includes an inner projection 64*b* projecting from a radially inner end of the roller support 64 toward the rolling element 44 in the circumferential direction. The inner projection 64*b* is tapered so that the inner projection 64*b* is thinner toward a circumferentially distal end (has triangular cross section). In the two roller supports 64, the gap between the distal ends of the inner projections 64*b* opposed to each other in the circumferential direction is set to be smaller than the diameter of the rolling element 44. The inner projections 64*b* restrict radially inward movement of the rolling elements 44. Thus, radially inward separation of the rolling elements 44 from the gaps between the corresponding two roller supports 64 is limited when the clutch 40 is assembled.

The retainer 43 further includes two couplers 65 coupling the lower end of a roller support 64 of one of the rolling element holders 62 and the lower end of a roller support 64 of the other rolling element holder 62. More specifically, in FIG. 5A, the lower end of the right roller support 64 of the upper rolling element holder 62 and the lower end of the right roller support 64 of the lower rolling element holder 62 are coupled by one of the couplers 65. Also, in FIG. 5A, the lower end of the left roller support 64 of the upper rolling element holder 62 and the lower end of the left roller support 64 of the lower rolling element holder 62 are coupled by the other coupler 65. Each of the couplers 65 is arcuate about the axis L2 as viewed in the axial direction. Additionally, a holding hook 66 projects from the lower end of each of the roller supports 64 between the roller supports 64 generally in the circumferential direction (refer to FIGS. 3 and 4). The holding hooks 66 prevent separation of the rolling elements 44 in the axial direction.

The retainer 43 having the configuration described above holds the rolling elements 44 between the two roller supports 64 of each of the two rolling element holders 62. More specifically, the two rolling elements 44 are located at equal angular intervals (in the present embodiment, 180° intervals) in the circumferential direction of the axis L2.

In the retainer 43 having the configuration described above, as shown in FIG. 3, the ring 61 is located between the fixing flange 41*a* of the collar 41 and the flange 52 of the driving-side rotor 42. The lower projection 61*a* and the upper projection 61*b* of the ring 61 are respectively in contact with the fixing flange 41*a* and the flange 52 in the axial direction.

As shown in FIGS. 3 and 5A, the roller supports 64 and the rolling elements 44 of the retainer 43 are located at the circumferentially inner side of the collar 41. The retainer 43 is rotational relative to the collar 41 in the circumferential direction. The outer circumferential surface of each of the rolling elements 44 is contactable with the inner circumferential surface of the collar 41.

The rolling element releasers 57 of the driving-side rotor 42 are inserted through the circumferentially inner side of the ring 61 of the retainer 43 into the collar 41. The rolling element releasers 57 are opposed to the couplers 65 of the retainer 43 in the axial direction. More specifically, as shown in FIG. 5A, the rolling element releasers 57 are located between the rolling element holders 62 in the circumferential direction and configured so that the circumferentially opposite ends (elastic portions 58) of the rolling element releasers 57 are opposed to the roller supports 64 of the rolling element holders 62 in the circumferential direction. The retainer 43 and the driving-side rotor 42 are relatively rotational in the circumferential direction. The rolling element releasers 57 are configured to contact the roller supports 64 located frontward in the rotation direction when the driving-side rotor 42 rotates (refer to FIG. 7).

As shown in FIG. 3, the driven-side rotor 45 of the clutch 40 is formed integrally with the basal end of the worm shaft 34. The driven-side rotor 45 includes a control portion 71 and a driven-side coupling portion 72 aligned in the axial direction. The driven-side coupling portion 72 is located at a basal side (upper side) of the control portion 71.

The control portion 71 is formed integrally with the worm shaft 34 and has the form of a rod extending in the axial direction of the worm shaft 34. The control portion 71 has an axis aligned with the axis L2 of the worm shaft 34 and is coaxial with the worm shaft 34. As shown in FIG. 5A, the control portion 71 is symmetrical with respect to a point in the axis L2 of the worm shaft 34.

The circumferential surface of the control portion 71 includes two control surfaces 73. The control surfaces 73 are formed on the circumferential surface of the control portion 71 at two positions at equal angular intervals (in the present embodiment, 180° intervals) in the circumferential direction. The control surfaces 73 are flat and parallel to the axial direction and orthogonal to the radial direction of the driven-side rotor 45. Additionally, the two control surfaces 73 are parallel to each other, and the control surfaces 73 are longer in the axial direction than the rolling elements 44.

As shown in FIG. 5B, the driven-side coupling portion 72 is rod-shaped and extends in the axial direction of the worm shaft 34. The driven-side coupling portion 72 has an axis aligned with the axis L2 of the worm shaft 34 and is coaxial with the worm shaft 34. The driven-side coupling portion 72 is slightly thinner than the driven shaft socket 54. The driven-side coupling portion 72 has a generally elliptical cross section that is orthogonal to the axial direction. The cross sectional shape is constant in the axial direction. As viewed in the axial direction, the direction parallel to the control surfaces 73 defines the longitudinal direction of the driven-side coupling portion 72, and the direction orthogonal to the control surfaces 73 defines the transverse direction of the driven-side coupling portion 72 (also refer to FIG. 5A). The driven-side coupling portion 72 is symmetrical with respect to a point in the axis L2 of the worm shaft 34.

The circumferential surface of the driven-side coupling portion 72 includes two first driven-side transmission surfaces 74 and two second driven-side transmission surfaces 75. One of the two first driven-side transmission surfaces 74 is located at a 180° opposite side of the other one of the two first driven-side transmission surfaces 74. The two first driven-side transmission surfaces 74 are flat and parallel to the axial direction and each other. The gap between the two first driven-side transmission surfaces 74 is equal to the gap between the two driving-side transmission surfaces 54a of the driven shaft socket 54 of the driving-side rotor 42.

The second driven-side transmission surfaces 75 are located between the two first driven-side transmission surfaces 74. One of the second driven-side transmission surfaces 75 is located at a 180° opposite side of the other second driven-side transmission surface 75. The two second driven-side transmission surfaces 75 are flat and parallel to the axial direction and each other. The gap between the two second driven-side transmission surfaces 75 is equal to the gap between the two driving-side transmission surfaces 54a of the driven shaft socket 54 of the driving-side rotor 42. The first driven-side transmission surfaces 74 and the second driven-side transmission surfaces 75 extend from one axial end to the other axial end of the driven-side coupling portion 72 in the axial direction.

As shown in FIG. 3, the driven-side rotor 45 described above is inserted into the inner side of the collar 41 and the retainer 43 from the side opposite to the driving-side rotor 42. The driven-side coupling portion 72 is inserted into the driven shaft socket 54 of the driving-side rotor 42, and the control portion 71 is located between the two rolling elements 44 held by the retainer 43. The driven-side rotor 45 is coaxial with the collar 41, the driving-side rotor 42, and the retainer 43.

As shown in FIG. 5B, the driven-side coupling portion 72 is loosely fitted into the driven shaft socket 54 to rotate integrally with the driving-side rotor 42. The first and second elastic members 55 and 56 are located between the circumferential surface of the driven-side coupling portion 72 and the inner surface of the driven shaft socket 54. More specifically, the two second elastic members 56 are in contact with longitudinally opposite ends of the driven-side coupling portion 72 as viewed in the axial direction. The four first elastic members 55 are located between the two first driven-side transmission surfaces 74 and the two second driven-side transmission surfaces 75 and the driving-side transmission surfaces 54a.

When the driving-side rotor 42 rotates with respect to the driven-side rotor 45 about the axis, the driving-side transmission surfaces 54a elastically deform the first elastic members 55 and come into contact with one of the first and second driven-side transmission surfaces 74 and 75 in the rotation direction. As a result, the driving-side rotor 42 engages the driven-side rotor 45 in the rotation direction, and rotational driving force of the driving-side rotor 42 is transmitted to the driven-side rotor 45.

As shown in FIG. 5A, the control portion 71 of the driven-side rotor 45 is inserted into the inner side of the retainer 43 so that the rolling elements 44 are located between the inner circumferential surface of the collar 41 and the control surfaces 73. More specifically, the retainer 43 holds the rolling elements 44 between the inner circumferential surface of the collar 41 and the control surfaces 73 of the driven-side rotor 45.

The distance between the control surfaces 73 and the inner circumferential surface of the collar 41 (gap in direction orthogonal to control surfaces 73) changes in the rotation direction of the driven-side rotor 45. In the present embodiment, the distance between the inner circumferential surface of the collar 41 and the control surfaces 73 is maximal at the circumferentially central position of each control surface 73 and gradually shortens from the circumferentially central position to circumferentially opposite ends of the control surface 73. The distance between the circumferentially center portion of the control surface 73 and the inner circumferential surface of the collar 41 is longer than the outer diameter (diameter) of the rolling elements 44. The distance between each circumferential end of the control surface 73 and the inner circumferential surface of the collar 41 is shorter than the outer diameter (diameter) of the rolling elements 44.

The operation and advantages of the motor 11 (particularly operation of clutch 40) will now be described.

As shown in FIG. 2, when the motor body 20 is stopped, that is, when the rotation shaft 24 is not driven and rotated and the driving-side rotor 42 is not driven and rotated, if a load is applied to the output shaft 13 from a load side (in the present embodiment, window regulator 12), the driven-side rotor 45 (worm shaft 34) acts to rotate caused by the load.

Figure 6A:
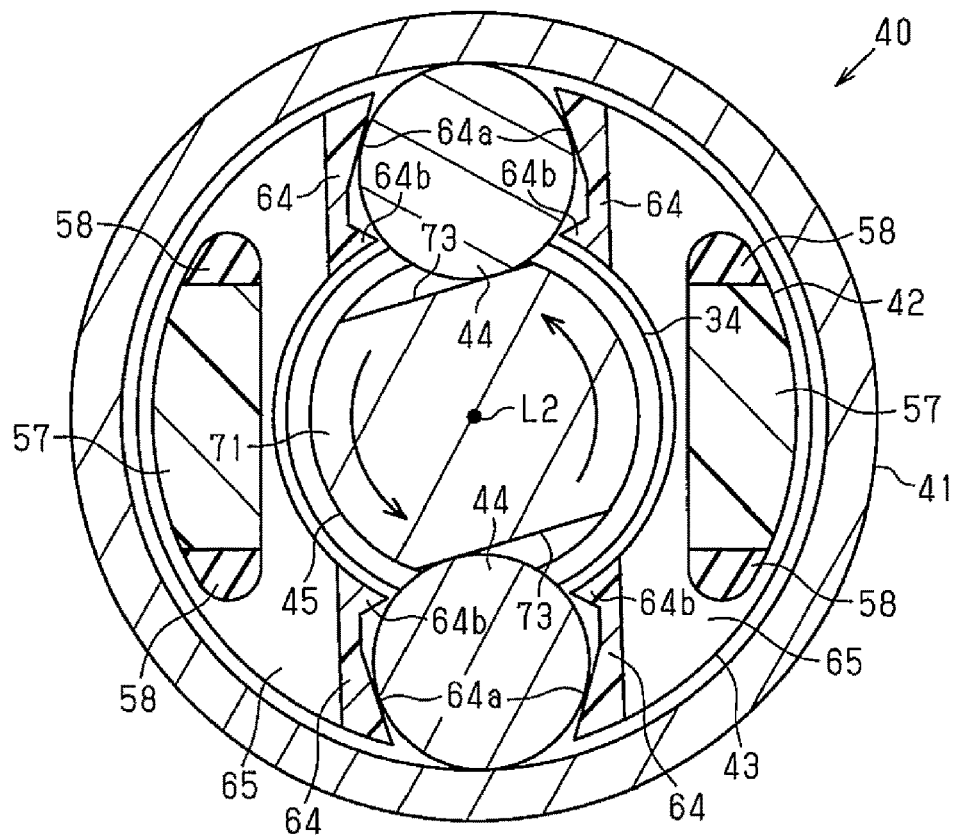
FIGS. 6A and 6B are cross-sectional views showing operations of the clutch shown in FIG. 4.

As shown in FIG. 6A, the control surfaces 73 of the driven-side rotor 45 push the rolling elements 44, which are located between the inner circumferential surface of the collar 41 and the control surfaces 73, toward a circumferentially outer side. Each of the rolling elements 44, which are pushed by the control surfaces 73, moves toward the circumferentially outer side between the corresponding two roller supports 64 and comes into contact with the inner circumferential surface of the collar 41. The rolling element 44 is held by the corresponding control surface 73 and the inner circumferential surface of the collar 41 at a position closer to a circumferential end than the center of the control surface 73. The rolling elements 44 function as wedges to prevent further rotation of the driven-side rotor 45 (i.e., lock rotation of worm shaft 34). In the lock state in which the rolling elements 44 are held by the inner circumferential surface of the collar 41 and the control surfaces 73, the rolling elements 44 are in contact with the respective control surfaces 73 and the inner circumferential surface of the collar 41 in the axial direction.

Figure 6B:
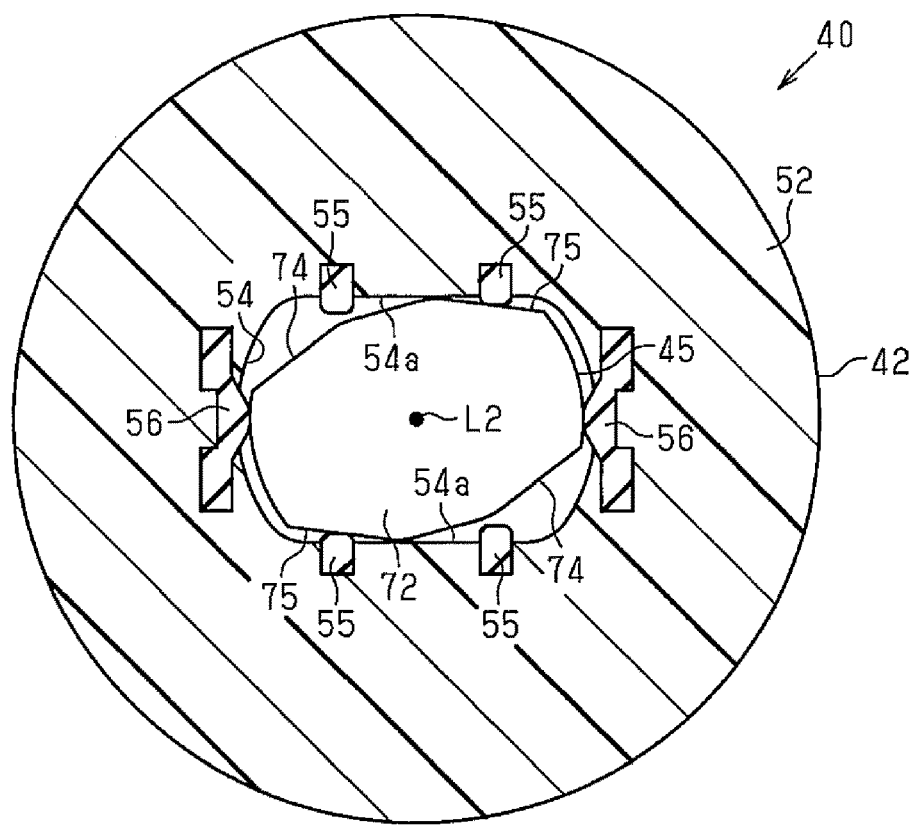

FIG. 6A illustrates a case in which rotational force is generated in the driven-side rotor 45 in the counterclockwise direction. However, when rotational force is generated in the driven-side rotor 45 in the clockwise direction, the rotation will also be prevented in the same manner. As described above, when the driving-side rotor 42 is not driven and rotated, rotation of the driven-side rotor 45 (worm shaft 34) is locked by the rolling elements 44 as wedges. This limits a situation in which the window glass WG is opened and closed by an external force other than the motor driving force. In the present embodiment, in the locked position of the worm shaft 34 shown in FIG. 6A (position where rotation of rolling elements 44 is prevented), as shown in FIG. 6B, the second driven-side transmission surfaces 75 (or first driven-side transmission surfaces 74) of the driven-side coupling portion 72 are not in contact with the driving-side transmission surfaces 54a of the driving-side rotor 42 in the rotation direction.

The operation of the clutch 40 when the rotation shaft 24 of the motor body 20 is driven and rotated with the driven-side rotor 45 in the lock state as described above (in state in which rolling elements 44 are held by collar 41 and control surfaces 73) will now be described.

Figure 7:
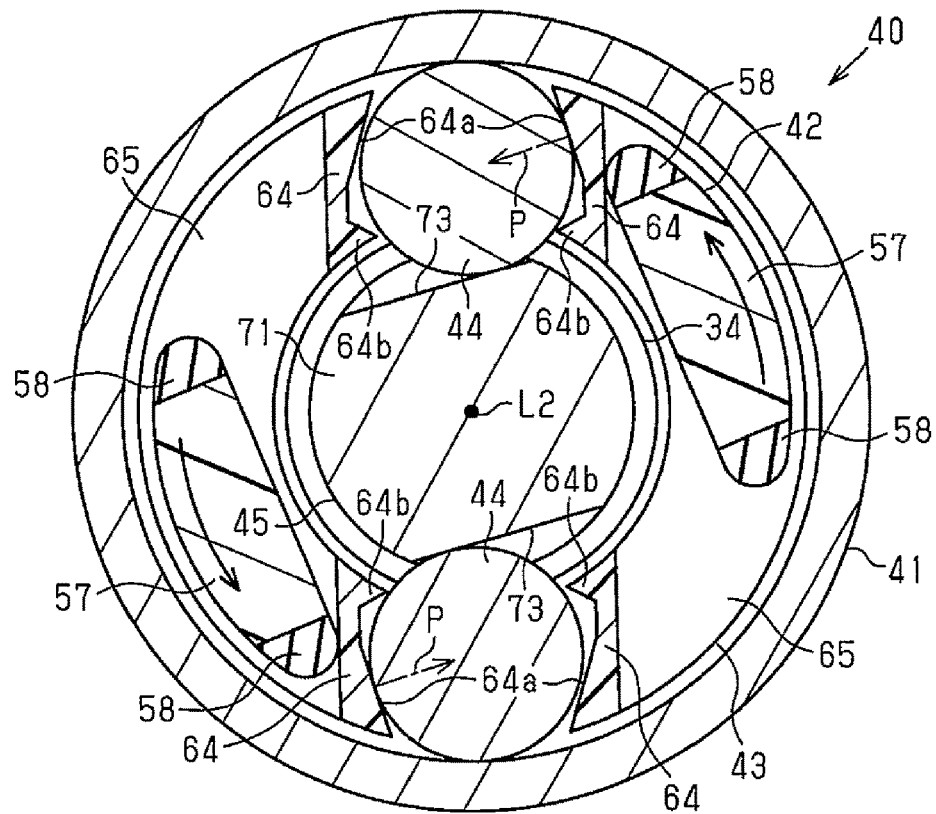
FIG. 7 is a cross-sectional view showing an operation of the clutch shown in FIG. 4.
Figure 8:
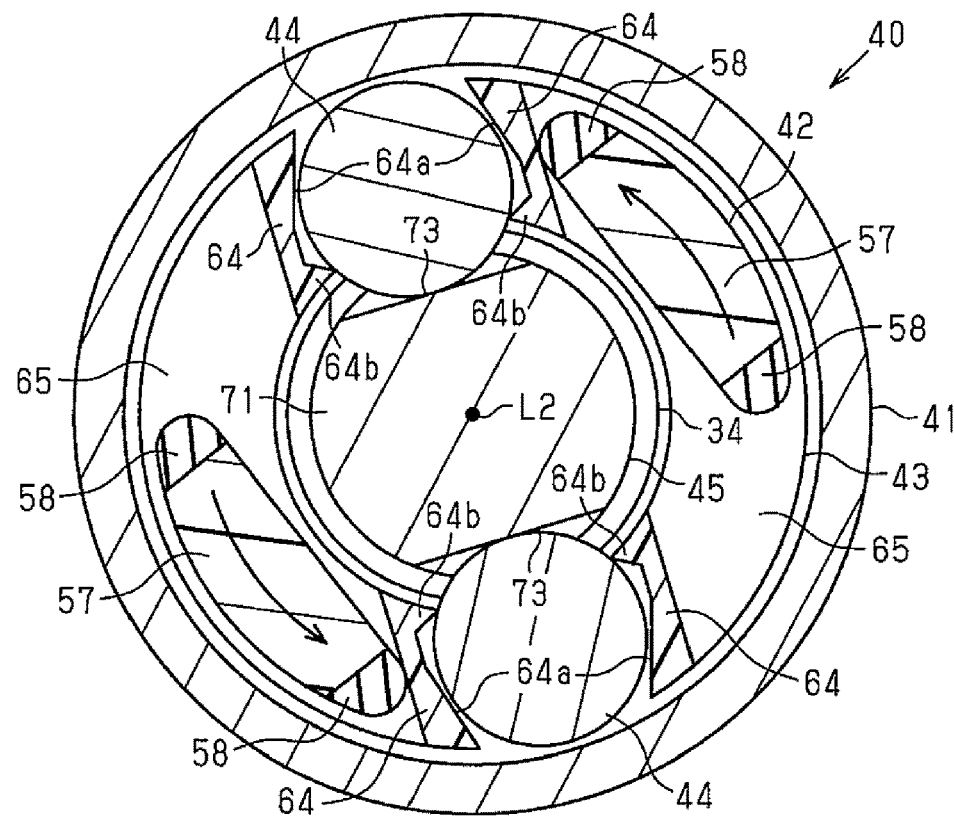
FIG. 8 is a cross-sectional view showing an operation of the clutch shown in FIG. 4.

When the motor body 20 is driven and rotated, the driving-side rotor 42 rotates together with the rotation shaft 24. As shown in FIG. 7, the circumferential ends (elastic portions 58) of the rolling element releasers 57 of the driving-side rotor 42 come into contact with the roller supports 64 of the retainer 43 in the rotation direction and push the rolling elements 44 via the roller supports 64 in the rotation direction. One of the tapered surfaces 64a of each roller support 64 contacts the corresponding rolling element 44 in the rotation direction. The tapered surface 64a contacts the rolling element 44 at an outer side of the axis of the rolling element 44 in the radial direction of the clutch 40. The tapered surface 64a applies pushing force P to the rolling element 44 in the perpendicular direction of the tapered surface 64a, that is, a direction inclined radially inward (toward axis L2) with respect to the rotation direction of the retainer 43 (rolling element releasers 57). The pushing force P moves the rolling element 44 radially inward (toward axis L2) and toward the circumferentially central portion of the control surface 73. As a result, as shown in FIG. 8, the rolling elements 44 are released from a state held by the inner circumferential surface of the collar 41 and the control surfaces 73 and changed to a released state in which the rolling elements 44 do not interfere with rotation of the driven-side rotor 45 (worm shaft 34). The components (collar 41, driving-side rotor 42, retainer 43, rolling elements 44, and driven-side rotor 45) of the clutch 40 are symmetrical with respect to a point in the axis. Thus, the two rolling elements 44 are released from the lock state at substantially the same timing.

Subsequently, the driving-side transmission surfaces 54a of the driving-side rotor 42 come into contact with the first driven-side transmission surfaces 74 of the driven-side rotor 45 in the rotation direction. The rotational force of the driving-side rotor 42 is transmitted to the driven-side rotor 45, and the rotation shaft 24 and the worm shaft 34 rotate integrally. At this time, the retainer 43 and the rolling elements 44, which are pushed by the rolling element releasers 57 in the rotation direction, rotate together with the driving-side rotor 42 and the driven-side rotor 45. Rotation of the worm shaft 34 is transmitted via the worm wheel 37 to the output shaft 13. The window regulator 12, which is coupled to the output shaft 13, is actuated to open (or close) the window glass WG. FIGS. 7 and 8 show operations when the driving-side rotor 42 rotates in the counterclockwise direction. When the driving-side rotor 42 rotates in the clockwise direction, the same operation is performed.

The advantages of the present embodiment will now be described.

When the lock is released, the rolling elements 44 are pushed and urged radially inward by the tapered surfaces 64a. Thus, the tapered surfaces 64a guide the rolling elements 44 radially inward. Thus, when the lock is released, the rolling elements 44 are smoothly separated from the inner circumferential surface of the collar 41. This limits generation of noise caused by the rolling elements 44 sliding along the inner circumferential surface of the collar 41. Further, in consideration of sliding of the rolling elements 44 along the control surfaces 73, it is preferred that the perpendicular direction (i.e., direction of pushing force P) of the tapered surface 64a be configured to be parallel to the control surfaces 73 when the lock is released.

The above embodiment may be modified as follows.

The configuration, such as the shape, of the retainer 43 is not limited to that of the above embodiment and may be changed in accordance with other configurations.

In the above embodiment, the inner projection 64b may be omitted from each of the roller supports 64.

In the above embodiment, each of the roller supports 64 includes the tapered surface 64a as a guide portion guiding the rolling element 44 radially inward when the lock is released. The configuration of the guide portion is not limited to the tapered surface 64a. For example, the guide portion may be a projection (projection that does not include tapered surface 64a) projecting from each of the roller supports 64 toward the rolling element 44 in the circumferential direction so that when the lock is released, the projection comes into contact with the rolling element 44 at an outer side of the axis of the rolling element 44 with respect to the radial direction of the clutch 40. In this case, if the roller support 64 does not include any portion contacting the rolling element 44 other than the projection, the projection guides the rolling element 44 radially inward when the lock is released.

In the above embodiment, the tapered surface 64a of each of the roller supports 64 is parallel to the axial direction. The tapered surface 64a of the roller support 64, which is pushed by the rolling element releaser 57 when the lock is released, is configured so that the tapered surface 64a throughout in the axial direction comes into contact with the rolling element 44. Instead, the tapered surface 64a may be inclined with respect to the axial direction.

Figure 9A:
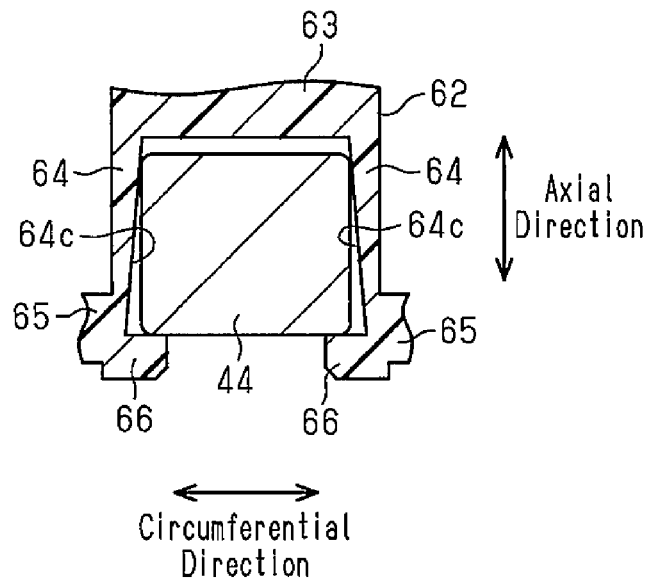
FIGS. 9A and 9B are cross-sectional views showing an operation of a modified example of a clutch.

For example, FIG. 9A shows that each of the roller supports 64 includes a tapered surface 64c (guide portion, second guide portion). The tapered surface 64c is an inclined surface inclined toward the rolling element 44 in the circumferential direction as the inclined surface extends toward one side (axial support 63) in the axial direction. More specifically, the tapered surface 64c is configured to be partially in contact with the rolling element 44 in the axial direction. In the drawing, the inclination angle of the tapered surface 64c is exaggerated to facilitate understanding.

Figure 9B:
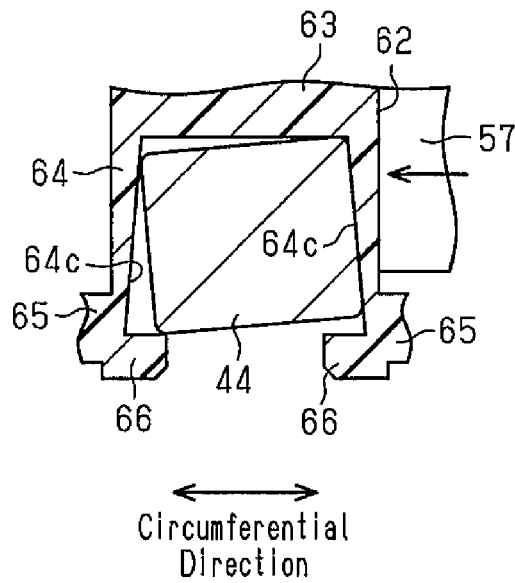

With this configuration, as shown in FIG. 9B, when the lock is released, the rolling element 44 is guided by the tapered surface 64c of the roller support 64 pushed by the rolling element releaser 57 and is inclined with respect to the axial direction (i.e., inclined along tapered surface 64c). This releases the rolling element 44 from the lock state (state held by control surfaces 73 and collar 41). At this time, the rolling element 44 is separated from the inner circumferential surface of the collar 41 in a stepped manner from an axially upper end side to an axially lower end side. This further limits generation of noise caused by sliding of the rolling elements 44 along the inner circumferential surface of the collar 41.

In the same manner as the tapered surface 64a of the above embodiment, the tapered surface 64c is inclined toward the rolling element 44 in the circumferential direction as the tapered surface 64c extends radially outward. Thus, when the lock is released, as the tapered surface 64c guides the rolling element 44 radially inward, the rolling element 44 is guided to be inclined with respect to the axial direction. However, there is no limit to such a configuration. Instead, the tapered surface 64c may be configured not to guide the rolling element 44 radially inward when the lock is released. More specifically, the tapered surface 64c does not necessarily have to be inclined toward the rolling element 44 as the tapered surface 64c extends radially outward.

The number of rolling elements 44 included in the clutch 40 is not limited to two as in the above embodiment and may be one or three or more. Also, for example, the number of control surfaces 73, the number of rolling element holders 62 of the retainer 43, and the number of rolling element releasers 57 may be changed in accordance with the number of rolling elements 44.

In the above embodiment, the two rolling elements 44 are released from the lock state at substantially the same timing. Instead, the two rolling elements 44 may be released from the lock state at different timings.

Figure 10:
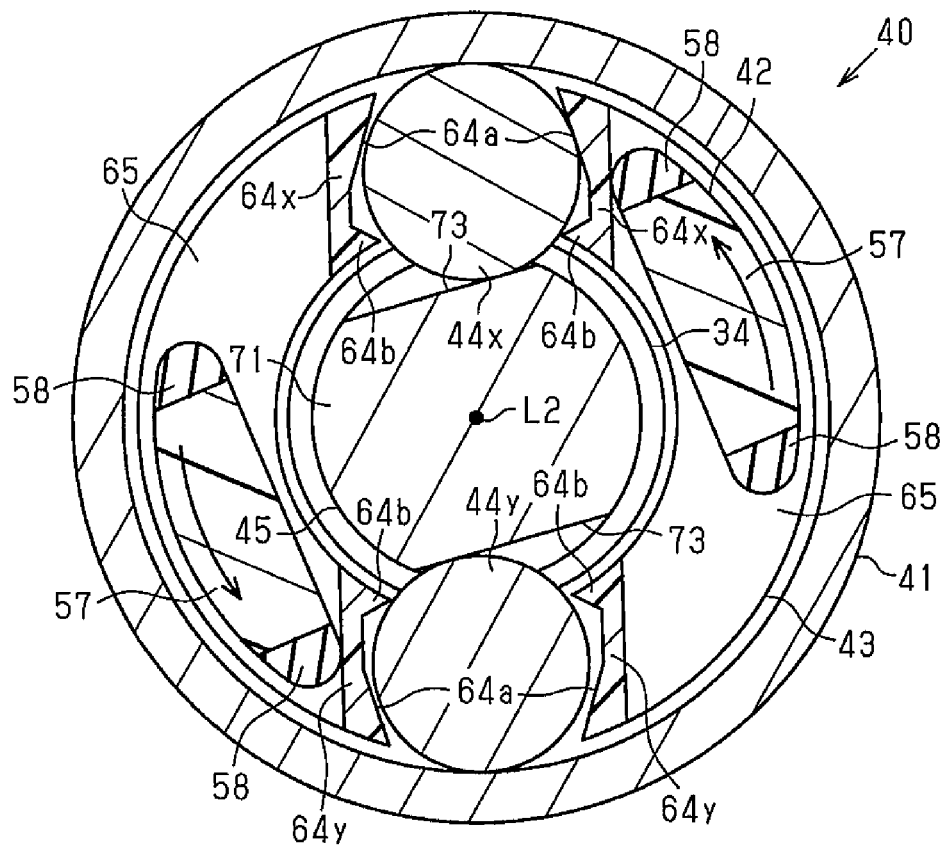
FIG. 10 is a cross-sectional view showing a modified example of a clutch.

For example, in the configuration shown in FIG. 10, two roller supports 64x holding one of the two rolling elements 44 (rolling element 44x) and two roller supports 64y holding the other one (rolling element 44y) are not symmetrical with respect to a point in the axis L2. More specifically, the gap between the tapered surfaces 64a opposed to each other in the circumferential direction differs between the two roller supports 64x and the two roller supports 64y. The gap between the tapered surfaces 64a of the two roller supports 64y is set to be wider than the gap between the tapered surfaces 64a of the two roller supports 64x. Thus, when the tapered surface 64a of the roller support 64x pushed by one of the rolling element releasers 57 comes into contact with the rolling element 44x and the rolling element 44x is released from the lock state, the rolling element 44y remains in the lock state without the tapered surface 64a of the roller support 64y pushed by the other one of the rolling element releasers 57 contacting the rolling element 44y. In the configuration shown in the drawing, the pushing portion (portion having tapered surface 64a) of each roller support 64y, which pushes the rolling element 44y in the rotation direction, is set to be thinner in the circumferential direction than the pushing portion (portion having tapered surface 64a) of each roller support 64x, which pushes the rolling element 44x in the rotation direction.

With such a configuration, after one of the rolling elements represented by 44x is pushed by the tapered surface 64a of the roller support 64x and released from the lock state, the other one of the rolling elements represented by 44y is pushed by the tapered surface 64a of the roller support 64y and released from the lock state. Accordingly, vibration caused by releases of the rolling elements 44x and 44y from the lock state occurs at different timings. Thus, noise generated by the releases from the lock state is reduced as compared to when the rolling elements 44x and 44y are simultaneously released from the lock state (vibration simultaneously occurs).

Figure 11:
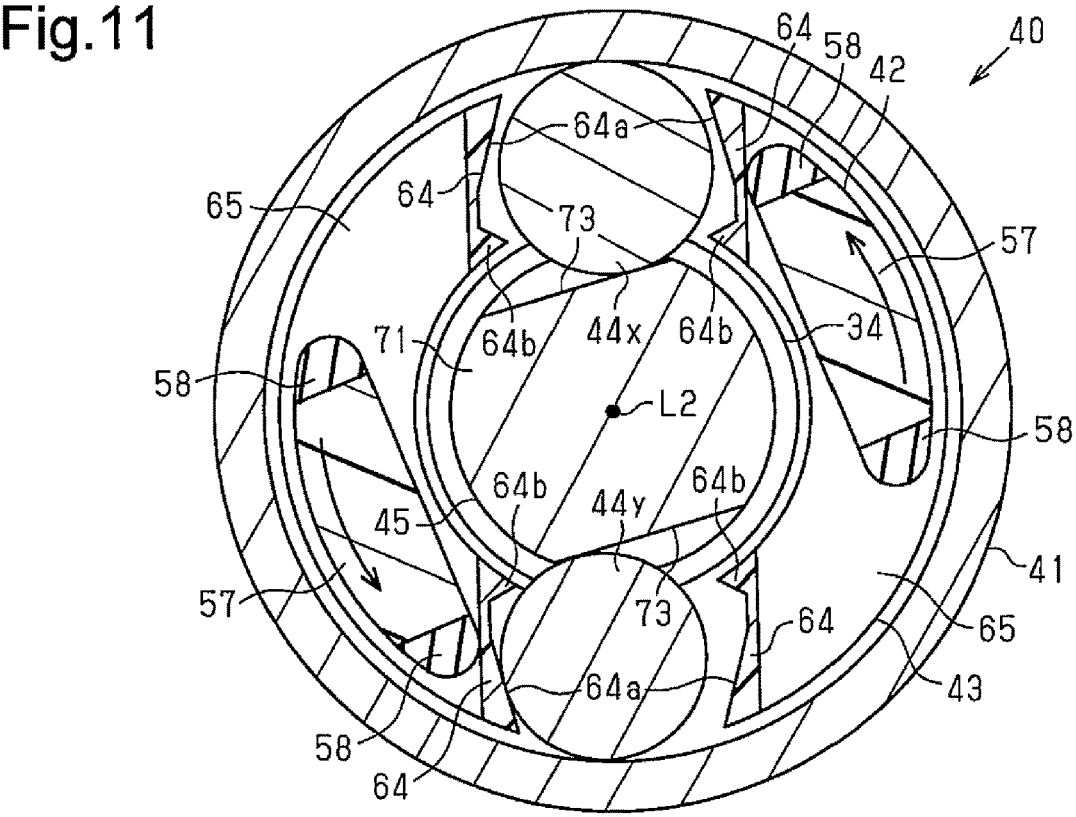
FIG. 11 is a cross-sectional view showing a modified example of a clutch.
Figure 12:
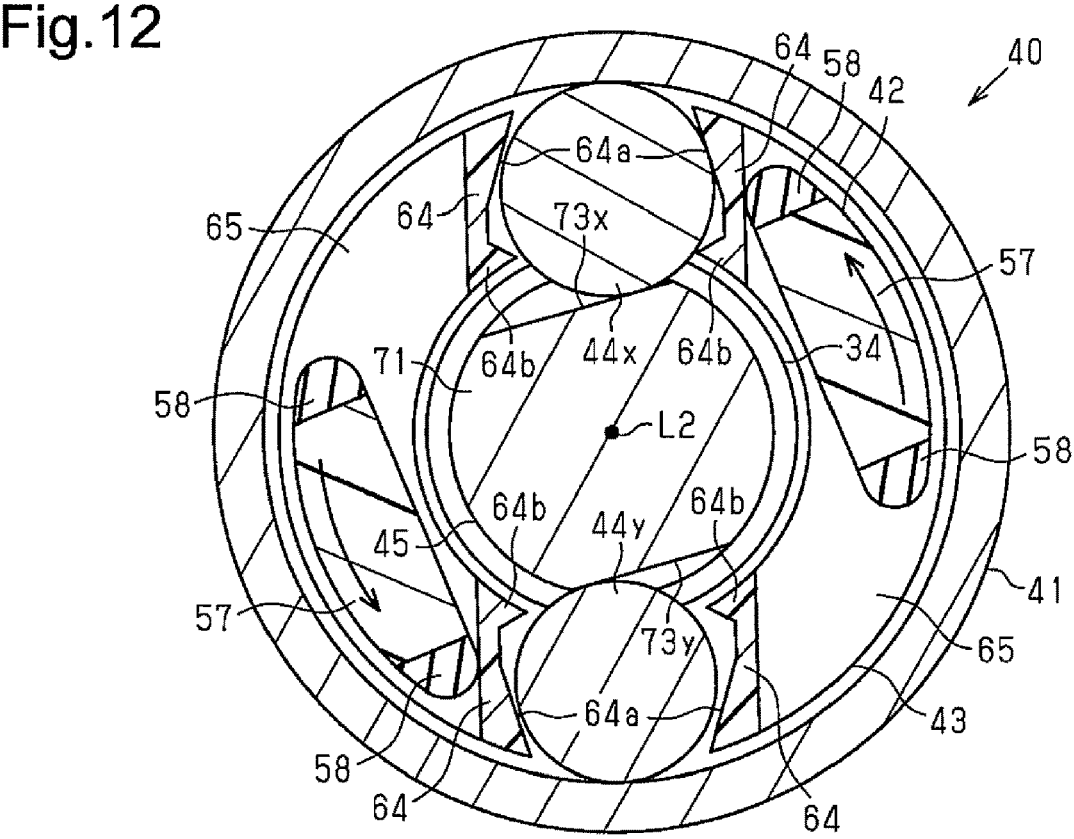
FIG. 12 is a cross-sectional view showing a modified example of a clutch.

Alternatively, for example, as in the configurations shown in FIGS. 11 and 12, the rolling elements 44x and 44y may differ in diameter so that the rolling elements 44x and 44y are released from the lock state at different timings.

In the configuration shown in FIG. 11, the control portion 71 having the two control surfaces 73 on the circumferential surface is symmetrical with respect to a point in the axis L2. When the driving-side rotor 42 is not driven and rotated and the driven-side rotor 45 is rotated, the timing for locking (holding between control surfaces 73 and collar 41) slightly differs between the rolling elements 44x and 44y.

With the rolling elements 44x and 44y in the lock state, when the driving-side rotor 42 (rolling element releasers 57) is driven and rotated in the counterclockwise direction in FIG. 11, the tapered surface 64a of the roller support 64 first comes into contact with the rolling element 44y having a small diameter in the rotation direction, and the rolling element 44y is released from the lock state. At the time of this release, the rolling element 44x remains in the lock state without the tapered surface 64a of the roller support 64 contacting the rolling element 44x having a large diameter in the rotation direction. When the driving-side rotor 42 is further driven and rotated in the counterclockwise direction, the tapered surface 64a of the roller support 64 comes into contact with the rolling element 44x having a large diameter in the rotation direction, and the rolling element 44x is released from the lock state.

When the driving-side rotor 42 (rolling element releasers 57) is driven and rotated in the clockwise direction in FIG. 11, the tapered surface 64a of the roller support 64 first comes into contact with the rolling element 44*x* having a large diameter in the rotation direction, and the rolling element 44*x* is released from the lock state. At the time of this release, the rolling element 44*y* remains in the lock state without the tapered surface 64*a* of the roller support 64 contacting the rolling element 44*y* having a small diameter in the rotation direction. When the driving-side rotor 42 is further driven and rotated in the clockwise direction, the tapered surface 64*a* of the roller support 64 comes into contact with the rolling element 44*y* having a small diameter in the rotation direction, and the rolling element 44*y* is released from the lock state.

As described above, when the rolling elements 44*x* and 44*y* have different diameters, the rolling elements 44*x* and 44*y* are released from the lock state at different timings. Thus, noise caused by releases from the lock state is reduced.

In the configuration shown in FIG. 12, a control surface 73*y* that is opposed to the rolling element 44*y* is configured so that the gap with the inner circumferential surface of the collar 41 is narrower in accordance with the diameter of the rolling element 44*y*. More specifically, the dimension (distance from axis L2) of the control surface 73*y* is set to be greater than the dimension (distance from axis L2) of a control surface 73*x* that is opposed to the rolling element 44*x* having a large diameter. When the driving-side rotor 42 is not driven and rotated and the driven-side rotor 45 is rotated, timings for locking the rolling elements 44*x* and 44*y* having different diameters (holding by control surface 73 and collar 41) may conform to each other.

In the configuration shown in FIG. 12, when the driving-side rotor 42 (rolling element releasers 57) is driven and rotated, the tapered surface 64*a* of the roller support 64 first comes into contact with the rolling element 44*x* having a large diameter in the rotation direction, and the rolling element 44*x* is released from the lock state. At the time of this release, the rolling element 44*y* remains in the lock state without the tapered surface 64*a* of the roller support 64 contacting the rolling element 44*y* having a small diameter in the rotation direction. When the driving-side rotor 42 is further driven and rotated, the tapered surface 64*a* of the roller support 64 comes into contact with the rolling element 44*y* having a small diameter in the rotation direction, and the rolling element 44*y* is released from the lock state. With such a configuration, the rolling elements 44*x* and 44*y* may be released from the lock state at different timings. Thus, noise generated by the release from the lock state is reduced.

In the configurations shown in FIGS. 10 to 12, each of the roller supports 64 (64*x*, 64*y*) may be configured not to include the tapered surface 64*a*. More specifically, the circumferentially inner surface of each of the roller supports 64 (64*x*, 64*y*) (side surface opposed to rolling element 44*x* or 44*y*) does not necessarily have to be inclined toward the rolling element 44 in the circumferential direction as the circumferentially inner surface extends radially outward.

In the above embodiment, the axes of the rolling elements 44 are configured to be parallel to the axis L2 of the worm shaft 34. Instead, the axes of the rolling elements 44 can be configured to be slightly inclined with respect to the axis L2 of the worm shaft 34. In the above embodiment, the rolling elements 44 are generally cylindrical. Alternatively, the rolling elements 44 may be, for example, spherical.

The coupling portion 24*a* of the rotation shaft 24 and the driving shaft socket 53 into which the coupling portion 24*a* is fitted are not limited to the shapes (shapes having width across flats) of the above embodiment. Any coupling shape configured to integrally rotate the coupling portion 24*a* and the driving shaft socket 53 may be used. Also, the shapes of the driven-side coupling portion 72 and the driven shaft socket 54 are not limited to those of the above embodiment.

In the above embodiment, the driven-side coupling portion 72 of the driven-side rotor 45 is configured to be inserted into the driven shaft socket 54 of the driving-side rotor 42 as a coupling configuration that integrally rotates the driving-side rotor 42 and the driven-side rotor 45. However, there is no particular limit to such a configuration. For example, an insertion recess may be sunken in the axial direction from the distal surface of the driven-side coupling portion 72, and a coupling projection of the driving-side rotor 42 may be inserted into the insertion recess.

In the above embodiment, the driving-side rotor 42 is separate from the rotation shaft 24 but instead may be formed integrally with the rotation shaft 24. In the above embodiment, the driven-side rotor 45 is formed integrally with the worm shaft 34. Instead, the driven-side rotor 45 may be separate from the worm shaft 34.

In the above embodiment, the present invention is applied to the power window device 10 using the X-arm type window regulator 12. Instead, the present invention may be applied to a power window device using a wire-type window regulator. Further, the present invention may be applied to an onboard device other than a power window device using a motor as a drive source. The clutch 40 of the above embodiment may be used in a device other than a motor.

The above embodiment and modified examples may be combined.

What is claimed is:

1. A clutch comprising:
an annular collar having an inner circumferential surface;
a driving-side rotor configured to be driven and rotated;
a driven-side rotor having a control surface opposed to the inner circumferential surface of the collar;
a rolling element located between the control surface and the collar and having two opposite sides in a circumferential direction of the collar; and
a retainer including two circumferential holders holding the two opposite sides of the rolling element, which is located between the control surface and the collar, wherein the retainer is configured to rotate in the circumferential direction, wherein
the clutch is configured, when the driving-side rotor is in a non-driven-rotated state, to prevent rotation of the driven-side rotor by setting the rolling element in a locked state in which the rolling element is held by the control surface and the collar,
the clutch is configured so that when the driving-side rotor is driven and rotated in the locked state, the driving-side rotor pushes the rolling element via the two circumferential holders in a rotation direction to release the rolling element from the locked state, and
each of the two circumferential holders includes an extending guide portion configured to guide the rolling element toward a radially inner side of the collar when the rolling element is released from the locked state.

2. The clutch according to claim 1, wherein
the extending guide portion has a tapered surface inclined toward the rolling element in the circumferential direction as the tapered surface extends radially outward, and
the tapered surface is contactable with the rolling element in the circumferential direction.

3. The clutch according to claim 1, wherein
the rolling element is rod-shaped and extends in an axial direction of the collar when located between the two circumferential holders,
the rolling element is configured, when the rolling element is in the locked state, to be in contact with the inner circumferential surface of the collar in the axial direction, and
the extending guide portion is configured, when the rolling element is released from the locked state, to guide the rolling element so that the rolling element is inclined with respect to the axial direction.

4. The clutch according to claim 3, wherein
the extending guide portion is inclined toward the rolling element in the circumferential direction as the extending guide portion extends toward one side in the axial direction, and
the extending guide portion includes an inclined surface contactable with the rolling element in the circumferential direction.

5. The clutch according to claim 1, wherein
the rolling element is at least one of a first rolling element and a second rolling element,
the two circumferential holders are at least one of a set of two first circumferential holders corresponding to the first rolling element and a set of two second circumferential holders corresponding to the second rolling element, and
the clutch is configured so that when the driving-side rotor is driven and rotated with the first rolling element and the second rolling element in the locked state, at least one of the first circumferential holders come into contact with the first rolling element in the rotation direction and the first rolling element is released from the locked state, while the second rolling element remains in the locked state without the second circumferential holders contacting the second rolling element in the rotation direction.

6. A motor comprising:
the clutch according to claim 1;
a motor body including a rotation shaft configured to rotate integrally with the driving-side rotor of the clutch; and
a speed reduction portion including a driven shaft configured to rotate integrally with the driven-side rotor of the clutch, wherein the speed reduction portion is configured to reduce speed of rotational driving force transmitted from the rotation shaft through the driving-side rotor and the driven-side rotor to the driven shaft and output the rotational driving force.

7. A power window device comprising:
the motor according to claim 6 as a drive source; and
a window glass configured to selectively open and close based on driving of the motor.

* * * * *